United States Patent [19]

Karlsson

[11] Patent Number: 4,693,154
[45] Date of Patent: Sep. 15, 1987

[54] METHOD AND APPARATUS FOR DIVIDING AND FURTHER TREATMENT OF UNITS OF GOODS

[75] Inventor: Gösta Karlsson, Vimmerby, Sweden

[73] Assignee: B & D Autolines AB, Malmo, Sweden

[21] Appl. No.: 858,819

[22] Filed: May 2, 1986

[51] Int. Cl.⁴ .......................... A21C 15/04; B26D 3/24
[52] U.S. Cl. ........................................ 83/161; 83/102; 83/107; 83/155; 83/155.1
[58] Field of Search .............. 83/102, 107, 155, 155.1, 83/161

[56] References Cited

U.S. PATENT DOCUMENTS 2,801,663  8/1957  Lindauer .............................. 83/161
4,341,135  7/1982  Ufermann et al. ................ 83/155.1
4,363,251  12/1982  Carlson ................................. 83/155

Primary Examiner—Donald R. Schran
Attorney, Agent, or Firm—James E. Nilles

[57] ABSTRACT

A method and an apparatus for splitting pieces of material (1) into smaller units for further handling, whereby the piece of material (1) is split-up into preferably sector formed units which are placed on a rotatable solid or ringformed plate (10) built up from several sector shaped carrier discs (11) mounted in a pulling and guiding chain, and whereby the rotatable plate (10) upon actuation from the chain is rotated and the carrier discs (11) successively are rotated to a position substantially parallely to each other and are displaced in such parallel position to a station for further handling.

1 Claim, 8 Drawing Figures

METHOD AND APPARATUS FOR DIVIDING AND FURTHER TREATMENT OF UNITS OF GOODS

The present invention generally relates to a method and an apparatus for dividing pieces of goods into smaller units and for further treatment, for instance packing of said smaller units. More particularly the invention is directed to a method and an apparatus in which a piece of goods is divided into sector like, small units on division lines which meet at a specific point on the piece of material, preferably the center, whereupon the small units are rotated and/or displaced so that they are positioned in line with each other and are handled and packed in this position.

The invention is useful for dividing up several types of goods of several different shapes, and the invention is not limited to circular pieces of material nor even to pieces of material which are rotationally symmetrical about the said point at which the division lines meet. The dividing up of the pieces of goods or material and the rotation and/or the displacement of the units can be accomplished in a single step or in several successive steps. In the latter case the piece of material is successively divided into smaller and smaller units for final handling and packing of the smallest units.

The dividing of the pieces of material is generally for providing smaller and more easily handled units or single portion "plate units". It is known to divide pieces of material into small units before packing said units. In case it is desired to pack such units separately or separated from each other, or in case it is desired to pack the units in a package or container of other shape than the shape of the original piece of material, it has so far in most cases been necessary to handle the units manually and this is a time consuming, expensive, monotonous and unattractive job. Therefore there has been a need for a method and an apparatus providing an automated, preferably fully automated dividing handling process, in which the handling is made quicker and safer than before and completely without, or at least with a minimum of manual handling. For a highly hygienic or even aseptic handling and packing of the pieces of material a method and an apparatus of the afore mentioned type should be very helpful.

The invention has come up in connection with handling of food stuffs like fresh or deep frozen cakes, pies, bread-cakes or ice-cream, cheese, chocolate cakes and many other products, but it is obvious that the invention is as well useful for handling and packing of any other types of goods in which a quick, safe and cheap dividing up of the product into smaller, sector like units is wanted, and in which it is desired to pack the said sector units separately, placed at a specific distance from each other or lying in line with each other. Although the invention mainly will be described with reference to dividing up and packing of round cakes or puddings it should be observed that the invention is not limited to said special types of products.

BRIEF DESCRIPTION OF THE DRAWINGS

In the following the invention will be described with reference to the accompanying drawings in which FIG. 1 explains the method according to the invention in a diagrammatically illustrated double apparatus for dividing up round pieces of goods.

Figure 1:
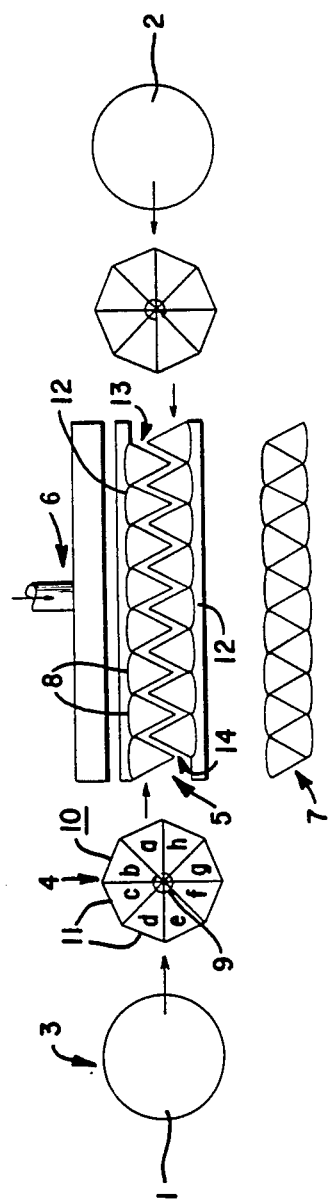

The apparatus shown in FIG. 1 is of twin type and is useful for handling two pieces of goods concurrently, namely one piece of product 1 coming from the left and one piece of product 2 coming from the right. Some means in the apparatus are in common for both sides, and therefore a twin apparatus can operate cheaper and quicker than two separate single apparatus.

The apparatus comprises two like and mirror symmetrical dividing means 3 which are not shown in detail and each of which is intended for dividing up one piece of material 1 or 2, two spreader means 4, two parallel displacement lines 5, a transverse displacement means 6 and a not illustrated means 7 for packing of the divided units of goods.

The dividing means can be of any known type, for instance vertically operating knives or cutting wires, by means of which the piece of material 1 or 2 is divided into sector like units, in the illustrated case eight sector like units 8 divided from one another by cuts along lines radiating from a common center 9. The dividing can be done separately but it is preferably done on the spreader means 4 which is formed as a rotatable disc 10 built up from eight sector plates 11 designated "a-h". As will be further explained in the following the sector plates 11 are connected with one another by a chain which is reciprocably movable on guides 12. The sector plates 11 in common cover 360° and they are divided at one place, namely between the sector plate a and the plate h. By rotating the left disc 10 as shown in the drawing in the clockwise direction and at the same time moving the chain with the sector plates 11 along the guide 12 the sector plates 11 are successively folded out and are displaced along a common line as shown by the line of displacment 5.

In the illustrated twin equipment one piece of material, for instance a cake or gâteau, is handled in the left part of the equipment and a second cake or gâteau in the right half of the equipment. The apparatus is designed so that the sector plates 11 together with the small units from each cake are displaced on one guide and are placed with the tips facing each other on the displacement line 5. The two handling parts can operate concurrently, but in a prefered embodiment of the invention the handling halves operate alternatingly, especially so that one unit provides for dividing a first cake while the second handling half is spreading and displacing the small units of the second cake and vice versa. Thereby it is possible to increase the total capacity without increasing the speed of the displacement lines.

In many cases it may be preferable to design the sector plates 11 with the interconnecting chain so that the sector plates are slightly spaced from each other at the same time that they are rotated moved out on the handling line, whereby the sector shaped small units are slightly spaced from each other along the displacement line 5.

When a row 13 or two rows 13, 14 of small units have been collected at the end position on the displacement line or displacement lines 5 said units will be in condition for being packed, and they are by a transverse displacement means 6 moved from the displacement line or lines 5 and are packed one by one or in a common package as known per se. Since the small units in this position are located in a line and in side-by-side relation to one another the packing can be done by means of known apparatus without any manual handling. When packing the small units in complete packs the advantage also has been achieved that the units together comprise nearly a parallelepiped which is well suited for being packed in boxes or similar means having the usual square or rectangular shape and in which the collected units well fill up said box.

Figure 2:
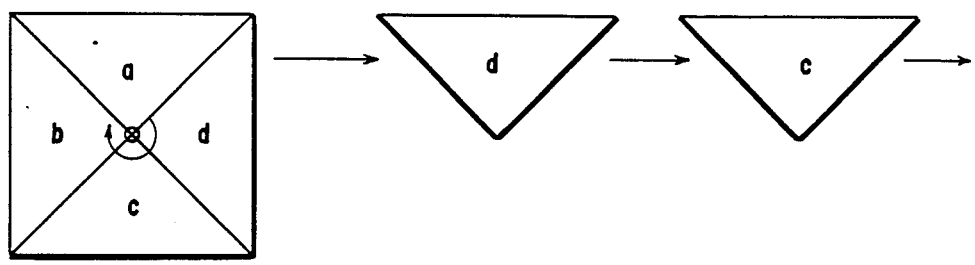
FIG. 2 diagrammatically illustrates dividing and handling of square products, and FIG. 3 correspondingly illustrates dividing square pieces of goods in successive steps.
Figure 3:
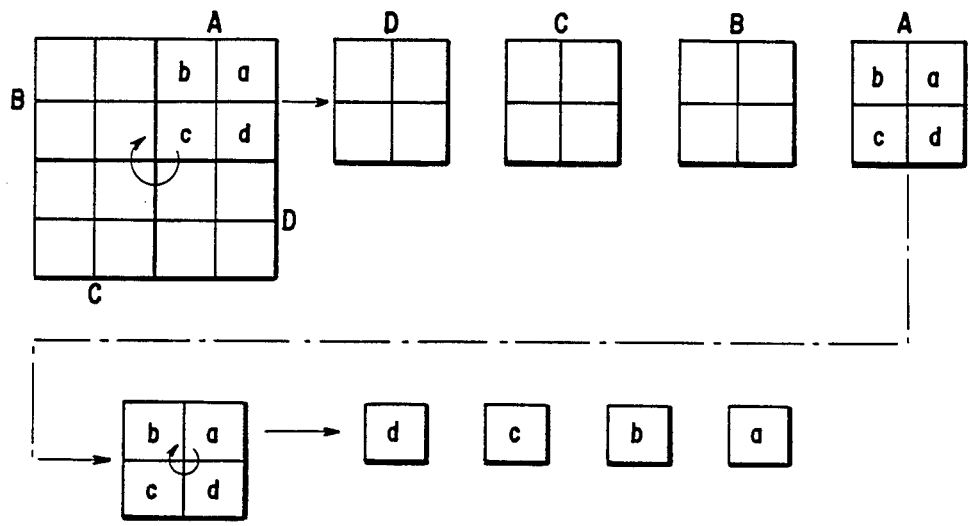

By the described method it is also possible to divide pieces of material having any other shape, provided that division is on cut lines that meet at common center. FIG. 2 shows diagrammatically how to divide a square piece of material into four triangular units. FIG. 3, in turn, shows how to divide a square piece of material in successive steps into 4×4=16 small square units. In the first step the piece of material ABCD is divided into four intermediate parts A, B, C and D, and in a second step each intermediate part, for instance part A, is in turn divided into four small units a, b, c and d. In all described cases the plate 10 consequently is rotated in the clockwise (or counter clockwise) direction at the same time as the sector plates 11 with the divided units are displaced linearly on a guide as described above.

Figure 4:
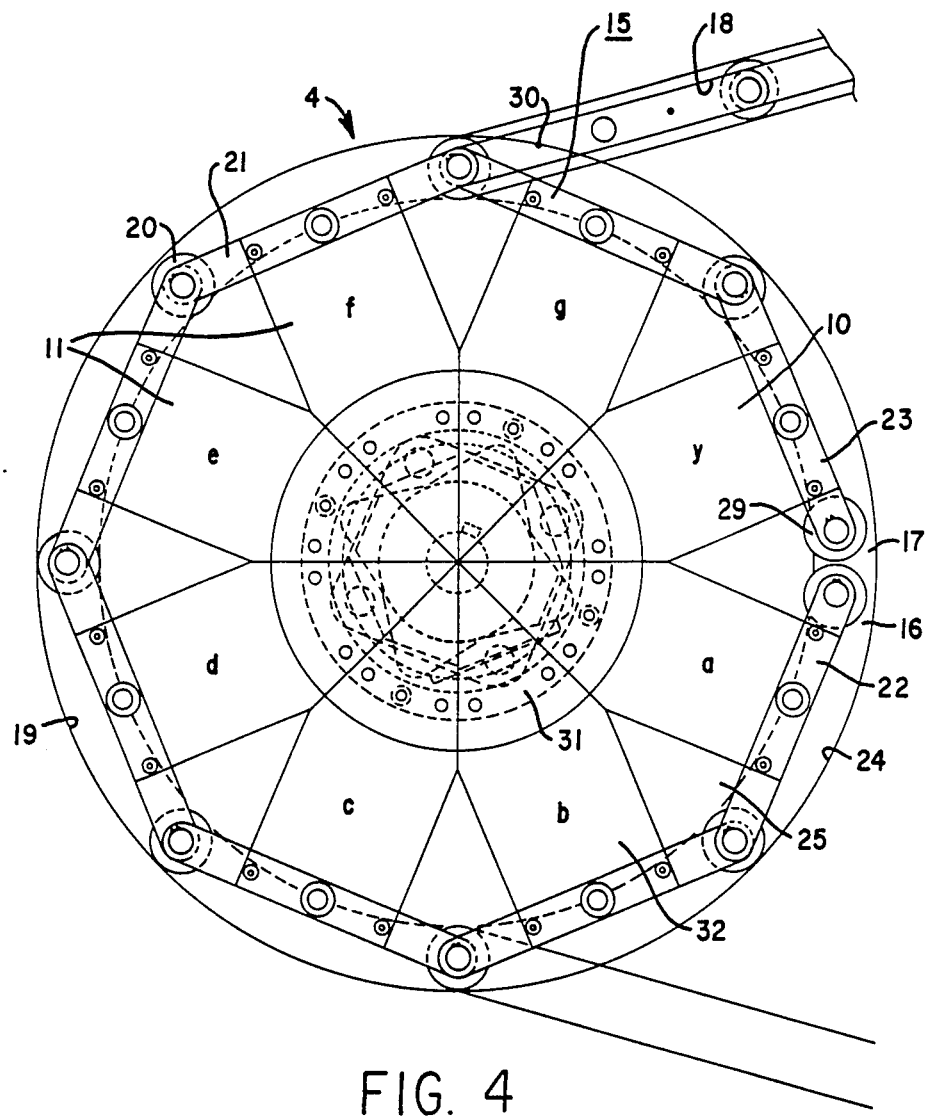
FIG. 4 shows a little part of a practical embodiment of a spreader for spreading and displacing the divided product units, seen from above.

One embodiment of a spreader means 4 is shown in FIG. 4. Said means comprises eight sector plates 11 having a common center 9 and mounted on a chain 15 having a first end 16 and a second end 17. The chain 15 is movable in a linear guide 18 which co-operates with a circular end guide 19. The chain runs in the guide on rollers 20 mounted between the chain links 21 on which the sector plates 11 are mounted. In the illustrated case the disc 10 is comprised of eight sector plates 11, but it is obvious that a larger or less number of sector plates can be used. In the case with the eight sector plates the two outer links 22 and 23, one at each end of the chain, are free hanging for being guided inwards towards the remaining sector plates, such guidance being provided by means of an auxiliary guide 24 for the circular end guide 19. A center disc 25 is used as a counter guide at the end position. The center disc 25 is formed with fitting grooves 27 (see FIG. 6) for the rolls 20, so that the chain with the sector plates 11 enters an exact position on the center disc 25.

Figure 5:
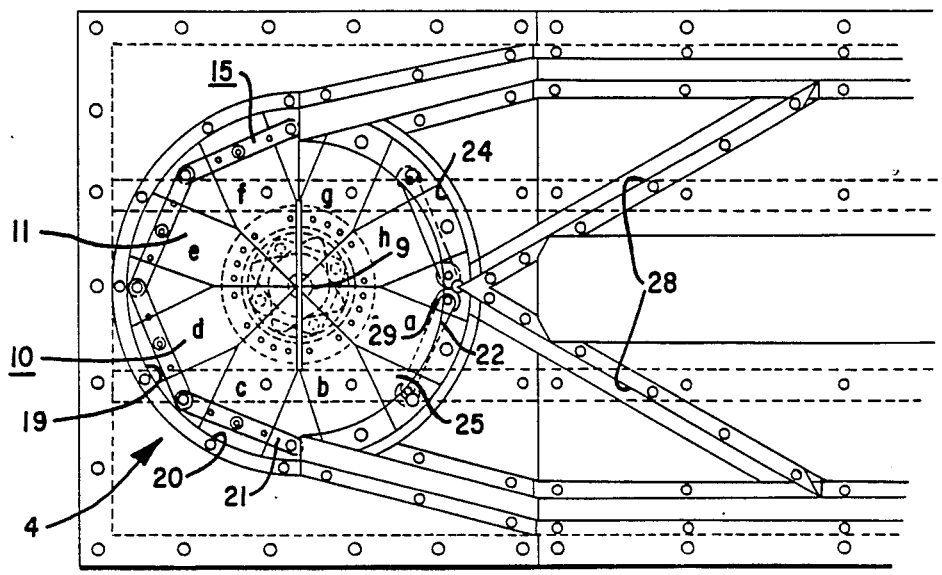
FIG. 5 shows a part of a guide means intended to be used in combination with the spreader of FIG. 4.
Figure 8:
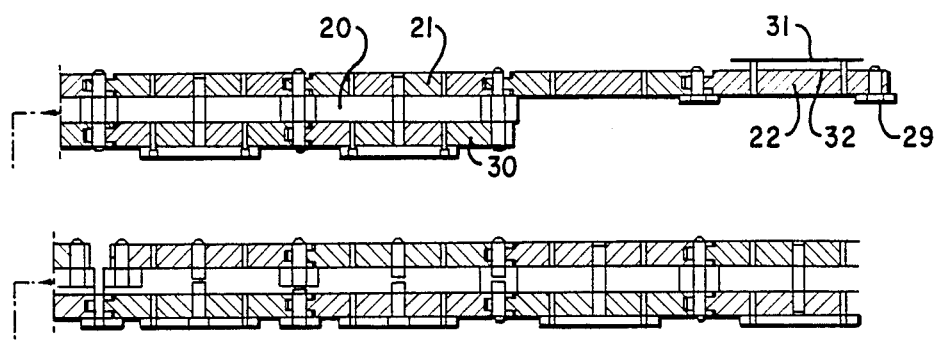
FIG. 8 shows a little part of a chain for the actuation of the dividing means.

The guides 18, 19 and 24 are best shown in FIG. 5. It is obvious that the sector plates c, d, e and f at the end position are guided between the end guide 19 and the center disc 25, whereas the sector plates a, b and g, h are guided between the auxiliary guide 24 and the center disc 25. For keeping the outer sector plates a, b and g, h in contact with the center disc 25 a tension spring 26 is connected between said pairs of sector plates, and for providing fixed positions for the sector plates the center disc 25 is formed with fitting grooves 27 that fit the roller 20 between the chain links 21. For guiding the outer sector plates a, b and g, h there is a secondary auxiliary guide 28 on a slightly higher level than the guide 18 and which turns up and guides the sector plates a, b and g, h into the guide 18 in that a roller 29 at the end of each outer link 22 is slidable against said guide 28. As best shown in FIG. 8 the pulling in is provided by a tension chain 30 which is connected to the sector plate chain 21 and which pulls the sector plates a-h out on the guide 18.

Figure 6:
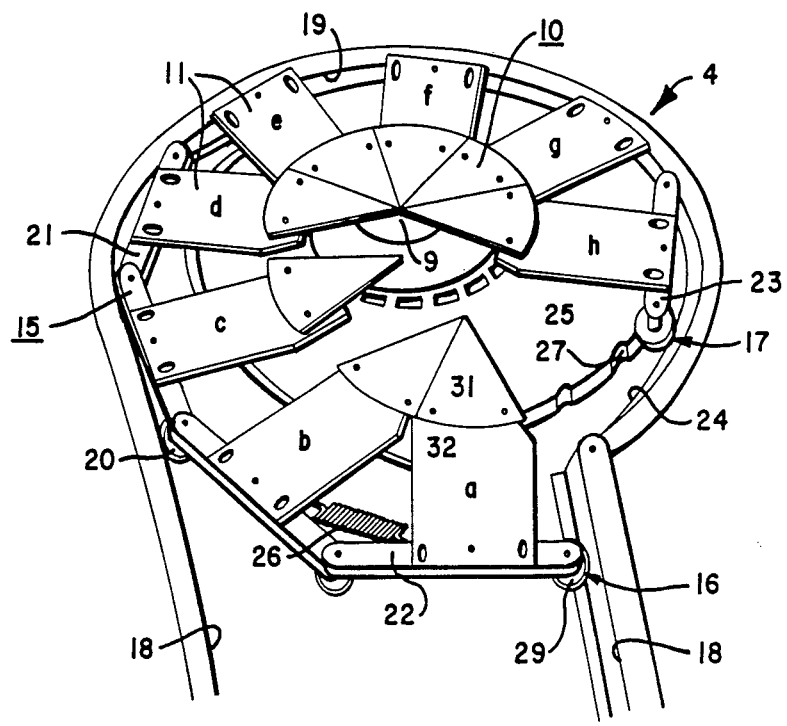
FIG. 6 is a perspective sketch of the spreader according to FIG. 4 in a starting position for spreading and displacing the divided units of goods.
Figure 7:
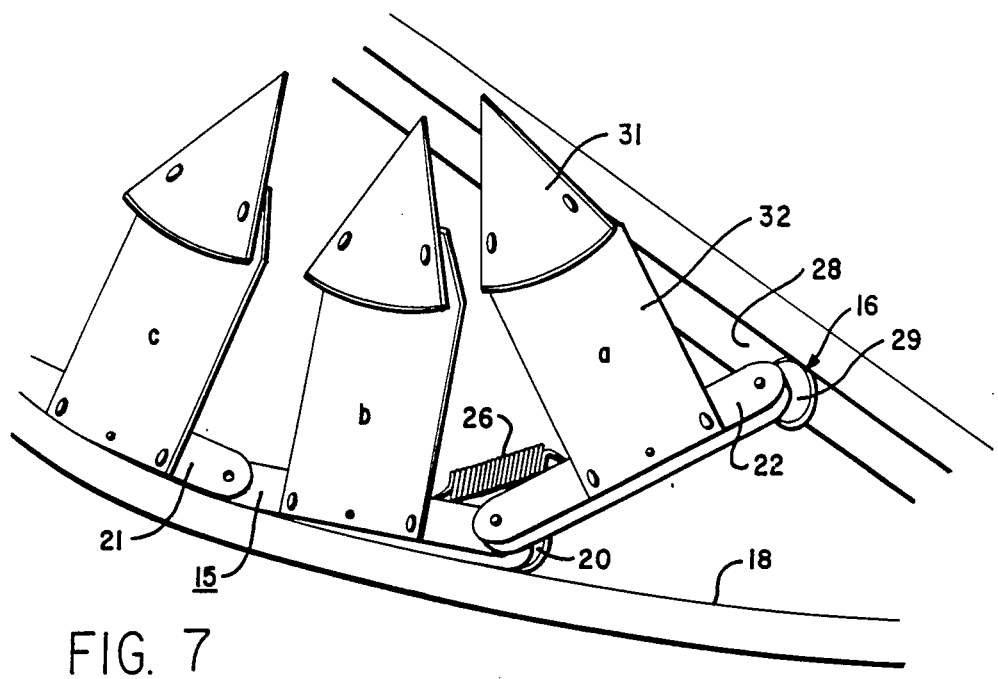
FIG. 7 shows the spreader of FIG. 6 in a slightly later stage.

The operation of the apparatus is best understood from FIGS. 6 and 7. In the starting position all eight sector plates are located over the center disc 25 and thereby provide a complete circle of substantially triangular carrier plates 31 each mounted on a guide plate 32 which in turn is mounted on a link 21 of the guide chain 15. On each sector plate there is a non-illustrated small unit which has been divided from an integral cake as described in connection with FIG. 1.

When operating the guide chain 15 and the pulling chain connected thereto the entire group of sector plates 11 is rotated, and in the first stage the outer plates a and b are separated from the center disc 25, whereby the outer link 22 (or 23) with its roller 29 comes into rolling contact with the secondary auxiliary guide 28 until the roller slides into the main guide 18. Successively all eight sector plates fold outward and are displaced along the linear guide 18 together with the small units of product that they carry, and the sector plates are placed in line with each other for continued handling, for instance separate packing of the small units. Since the triangular carrier plates 31 in the illustrated case are mounted on guide plates 32 which are more narrow than the links 21 and 22 the small units are spaced a predetermined distance from each other when folded out from the circular position, and this spacing of the small units facilitates the continued handling. The distance between the sector plates at the end position can be varied by making the circular guide 19 and thereby the links 21 smaller. In the extreme case the links are located so close to the triangular sector plates that those plates at the end position are located in direct contact with each other, and this is the case that is illustrated in FIG. 1.

After the small units have been removed from the sector plates at the end position of the chain the chain together with the sector plates is removed to the center disc and the apparatus is prepared for receiving a new piece of material for being divided, rotated out, linearly displaced and packed.

In the twin apparatus shown in FIG. 1 the sector plates can be mounted on one and the same endless chain, whereby the apparatus is designed so as to operate concurrently but mirror symmetrically in the two halves, so that two inversely directed sets of small units are located in the collection place at the end position for being further treated in common with each other.

By forming the sector plates of one and the same dividing and spreading means with a different shape and size and by dividing the piece of material into correspondingly formed small units it is also possible according to the invention to provide and handle many different shapes and sizes of units of material, and the invention is not limited to the illustrated triangular sectors even if this is generally the most suitable shape. It is also possible to form the sector plates so that they in common provide a ring suited for dividing a piece of material into arcuate small material units.

FIGS. 2 and 3 show that the sector plate can be formed with other shaped than as a circular disc sector. In FIG. 2 the sector plates collectively define a central plate that is square and divided into four quadrants. It could as well be divided into eight or more like or different parts.

It is to be understood that the illustrated and described method and apparatus are only of examplifying character and that many different modifications may be presented within the scope of the appended claims.

I claim:

1. Apparatus comprising supporting means for supporting a large piece of material such as a cake while cuts are made in it along cutting lines that radiate from a point to divide it into a plurality of small units and to define on each such small unit a pair of convergent surfaces each of which opposes one of said convergent surfaces on an adjacent small unit, and shifting means cooperating with said supporting means for moving said small units into a side-by-side aligned relationship with one another wherein said surfaces of adjacent small units are spaced apart, said apparatus being characterized by:

A. said supporting means comprising a sector plate for each of said small units,
      (1) each said sector plate having a top surface upon which its small unit rests and which has a pair of convergent side edges that correspond to adjacent cutting lines, and
      (2) each said sector plate having an inner end towards which its said edges converge and an outer end remote from said inner end;
   B. articulation means at said outer ends of the sector plates whereby they are so connected with one another as to comprise a chain having opposite ends and having one of said sector plates at each of said ends, said articulation means providing for swinging of the sector plates relative to one another and for maintaining their said top surfaces coplanar; and
   C. said shifting means comprising
      (1) actuating means connected with one of said sector plates for imparting motion to all of the sector plates in at least one direction transverse to their said edges and parallel to their sad top surfaces,
      (2) guide follower means on each sector plate adjacent to said outer end thereof, and
      (3) guide means engaged by said guide follower means, arranged to define a path which successive sector plates in said chain are constrained to follow as the sector plates are moved in said one direction and whereby the sector plates, collectively, are shifted between
         (a) a starting position in which all of the sector plates have their said edges radial to said point and the sector plates cooperate to support a large piece of material for cutting, and
         (b) a terminal position in which the sector plates are disposed with their inner ends in spaced apart relation to one another along a substantially straight line.

* * * * *